(12) United States Patent
Shimada et al.

(10) Patent No.: US 9,660,284 B2
(45) Date of Patent: May 23, 2017

(54) POWER CONVERSION SYSTEM (71) Applicant: Hitachi, Ltd., Tokyo (JP)

(72) Inventors: Atsushi Shimada, Tokyo (JP); Takao Ishikawa, Tokyo (JP); Masatoshi Sugimasa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 338 days.

(21) Appl. No.: 14/370,394

(22) PCT Filed: Dec. 3, 2012

(86) PCT No.: PCT/JP2012/081229
§ 371 (c)(1),
(2) Date: Jul. 2, 2014

(87) PCT Pub. No.: WO2013/103060
PCT Pub. Date: Jul. 11, 2013

(65) Prior Publication Data
US 2015/0037697 A1 Feb. 5, 2015

(30) Foreign Application Priority Data

Jan. 6, 2012 (JP) .................................. 2012-001267

(51) Int. Cl.
*H01M 8/12* (2016.01)
*H01M 8/06* (2016.01)
(Continued)

(52) U.S. Cl.
CPC ............. *H01M 8/0606* (2013.01); *C01B 3/26* (2013.01); *H01M 8/04014* (2013.01); *H01M 8/0435* (2013.01); *H01M 8/04067* (2013.01); *H01M 8/04216* (2013.01); *H01M 8/04343* (2013.01); *H01M 8/04365* (2013.01); *H01M 8/04373* (2013.01); *H01M 8/04731* (2013.01); *H01M 8/04738* (2013.01); *H01M 8/04753* (2013.01); *H01M 8/04776* (2013.01); *H01M 8/06* (2013.01); *H01M 8/0618* (2013.01);
(Continued)

(58) Field of Classification Search
None
See application file for complete search history.

(56) References Cited

FOREIGN PATENT DOCUMENTS

| JP | 2003-129836 A | 5/2003 |
| JP | 2004-189585 A | 7/2004 |
| JP | 2005-203266 A | 7/2005 |
| JP | 2005203266 A * | 7/2005 |

(Continued)

OTHER PUBLICATIONS

Japanese Office Action, Japanese Patent Application No. 2012-001267, Mar. 31, 2015, 5 pgs.

*Primary Examiner* — Daniel Gatewood
(74) *Attorney, Agent, or Firm* — Volpe and Koenig, P.C.

(57) ABSTRACT

Provided is a power conversion system having a solid-oxide fuel cell capable of stably generating electricity from hydrogen generated by an organic hydride. The power conversion system includes a solid-oxide fuel cell, a reactor for producing hydrogen and a dehydrogenation product from an organic hydride by dehydrogenation reaction, and a heat engine for generating motive power. The power conversion system separates the hydrogen produced by the reactor, and supplies the hydrogen as fuel to the solid-oxide fuel cell. Exhaust heat of the heat engine is supplied to both the solid-oxide fuel cell and the reactor.

6 Claims, 4 Drawing Sheets (51) Int. Cl.
  *H01M 8/04* (2016.01)
  *H01M 8/0606* (2016.01)
  *C01B 3/26* (2006.01)
  *H01M 8/0612* (2016.01)
  *H01M 8/04014* (2016.01)
  *H01M 8/04007* (2016.01)
  *H01M 8/04082* (2016.01)
  *H01M 8/0432* (2016.01)
  *H01M 8/04701* (2016.01)
  *H01M 8/04746* (2016.01)
  *H01M 8/124* (2016.01)

(52) U.S. Cl.
  CPC ........... *H01M 8/0625* (2013.01); *H01M 8/12* (2013.01); *C01B 2203/0277* (2013.01); *C01B 2203/066* (2013.01); *C01B 2203/1047* (2013.01); *C01B 2203/1252* (2013.01); *C01B 2203/16* (2013.01); *C01B 2203/1619* (2013.01); *C01B 2203/1633* (2013.01); *H01M 2008/1293* (2013.01); *H01M 2250/407* (2013.01); *Y02E 60/563* (2013.01); *Y02P 20/129* (2015.11)

(56) References Cited

FOREIGN PATENT DOCUMENTS

| | | | |
|---|---|---|---|
| JP | 2005-228525 A | | 8/2005 |
| JP | 2007-179991 A | | 7/2007 |
| JP | 2007179991 A | * | 7/2007 |
| JP | 2011-159585 A | | 8/2011 |
| JP | 2011159585 A | * | 8/2011 |

* cited by examiner

POWER CONVERSION SYSTEM

TECHNICAL FIELD

The present invention relates to a power conversion system provided with a solid-oxide fuel cell for generating power with hydrogen as fuel.

BACKGROUND ART

When an organic hydride is heated in the presence of a certain catalyst, a dehydrogenation reaction produces hydrogen and an aromatic hydrocarbon (dehydrogenation product). On the other hand, this dehydrogenation product reacts with hydrogen in the presence of a certain catalyst to produce an organic hydride. Accordingly, with such an organic hydride, it is possible to densely reserve hydrogen, which is obtained through decomposition of water by power generated by natural energy, surplus electricity, or the like, hydrogen, which is a byproduct in a process of manufacturing steel, petroleum refinery, manufacturing chemical, or hydrogen, which is obtained otherwise.

Conventionally, known is a system for producing hydrogen from an organic hydride, using the exhaust heat of a solid-oxide fuel cell (for example, see Patent Document 1). The temperature in power generation by a solid-oxide fuel cell with hydrogen as fuel becomes 600-1000° C. Accordingly, this system uses exhaust heat in heating (250-400° C.) a reactor to perform dehydrogenation reaction of an organic hydride.

In this system, the solid-oxide fuel cell generates power by hydrogen obtained from the organic hydride.

BACKGROUND ART DOCUMENT

Patent Document

Patent Document 1: Japanese Patent Application Publication No. 2005-203266

DISCLOSURE OF THE INVENTION

Problems to be Solved by the Invention

However, in this system, hydrogen cannot be produced until the temperature of the reactor reaches a certain temperature, and power cannot be generated until the temperature of the solid-oxide fuel cell reaches a certain temperature. That is, this system requires a heat source for warming up the solid-oxide fuel cell and the reactor until the temperatures of these become respective certain operation temperatures.

Further, in this system, even after both the solid-oxide fuel cell and the reactor have transitioned from a warming-up state to a normal operation state, the power generation rate of the solid-oxide fuel cell varies, depending on the variation in the external load, and the temperature of exhaust heat also varies, depending on the power generation rate. Still further, regarding the reactor, the heat amount for the above-described heating varies, depending on the amount of hydrogen supplied to the solid-oxide fuel cell. That is, the power generation rate and the temperature of the exhaust heat of the solid-oxide fuel cell vary, depending on the variation in the external load, in addition, the amount of hydrogen necessary for power generation varies, and on the other hand, the amount of hydrogen supplied by the reactor to the solid-oxide fuel cell varies. Accordingly, in this system, it is difficult to control the temperatures of the solid-oxide fuel cell and the reactor, which causes a problem that power generation cannot be stably performed.

In this situation, an object of the present invention is to provide a power conversion system provided with a solid-oxide fuel cell capable of stably generating power by hydrogen produced from an organic hydride.

Means for Solving the Problems

A power conversion system according to the present invention to solve the above-described problems includes: a solid-oxide fuel cell; a reactor for producing hydrogen and a dehydrogenation product from an organic hydride by dehydrogenation reaction; and a heat engine for generating motive power, the power conversion system separating the hydrogen produced by the reactor and supplying the hydrogen as fuel to the solid-oxide fuel cell, wherein exhaust heat of the heat engine is supplied to both the solid-oxide fuel cell and the reactor.

Advantage of the Invention

According to the present invention, it is possible to provide a power conversion system provided with a solid-oxide fuel cell capable of stably generating power by hydrogen produced from an organic hydride.

EMBODIMENT FOR CARRYING OUT THE INVENTION

An embodiment of the present invention will be described below, referring to the drawings, as appropriate.

Figure 1:
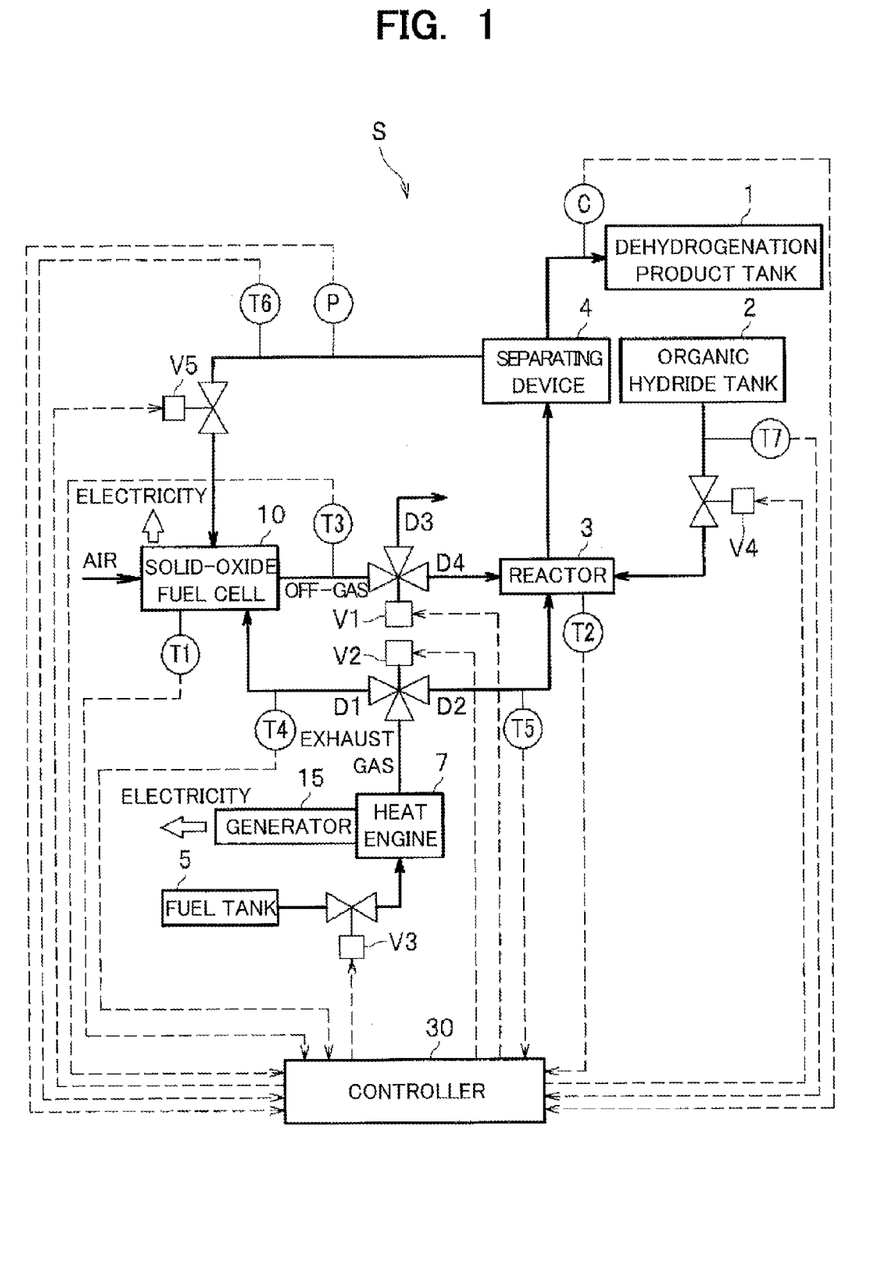
FIG. 1 is an illustration diagram of the configuration of a power conversion system according to an embodiment of the present invention.

As shown in FIG. 1, a power conversion system S according to the present invention is featured mainly in that the power conversion system S includes a reactor 3 for producing hydrogen from an organic hydride, a separating device 4 for separating the hydrogen produced by the reactor 3, a solid-oxide fuel cell (SOFC) 10 for generating power by the hydrogen separated by the separating device 4, a heat engine 7 for supplying exhaust heat to the reactor 3 and the solid-oxide fuel cell 10, and a controller 30 for controlling the power conversion system S according to a certain procedure described later. In the following, the heat engine 7, the solid-oxide fuel cell 10, the reactor 3, the separating device 4, and the controller 30 will be described in this order.

The heat engine 7 is an engine for conversion of a part of a taken-in heat into work (motive power). The heat engine 7 in the present embodiment generates motive power by combustion of fuel received from a fuel tank 5 via third valve V3, and is assumed to be an internal combustion engine, such as an engine, a gas turbine, and the like. The fuel can be a hydrocarbon fuel, for example, natural gas, LPG, gasoline, light oil, kerosene, heavy oil, or the like. The third valve V3 is provided at a pipe connecting the fuel tank 5 and the heat engine 7. The third valve V3 is a flow rate adjusting valve whose open degree is adjusted by an instruction from a later-described controller 30. The third valve V3 corresponds to 'third flow rate adjusting device' described in claims.

A heat engine 7 according to the present invention is not limited to such an internal combustion engine, and can be, for example, an external combustion engine, such as a steam turbine or a starling engine. In case of an external combustion engine, thermal medium transferred out from a certain heat source, instead of the fuel tank 5, is transferred to the heat engine 7 via the third valve V3. Incidentally, this heat source can be, for example, an electric furnace, a heating furnace, a boiler, a heat generating facility (waste heat) in a factory, or the like.

Further, the heat engine 7 has a generator 15 so that the generator 15 generates electricity by generated motive power.

Incidentally, the temperature of exhaust gas of the heat engine 7 is different, depending on the kind of the heat engine 7, and is only required to be a temperature that can heat both the solid-oxide fuel cell 10 and the reactor 3 and can thereby set the temperatures of these to the power generation temperature and the operation temperature, which will be described later. Incidentally, if the heat engine 7 is a gas turbine as an example, the temperature of exhaust gas can be set approximately to 1500° C. If the heat engine 7 is a gasoline engine as an example, the temperature of exhaust gas can be set approximately to 800° C. If the heat engine 7 is a steam turbine as an example, the temperature of the exhaust gas can be set approximately to 850° C.

Accompanying the exhaust gas from the heat engine 7, the exhaust heat from the heat engine 7 in the present embodiment is supplied via a second valve V2 to both the solid-oxide fuel cell 10 and the reactor 3, as described above. The second valve V2 is provided at a branch point of a pipe extending from the heat engine 7, wherein the pipe is branched and connected to the solid-oxide fuel cell 10 and the reactor 3. The second valve V2 is a three way flow rate adjusting valve that divides the flow of high temperature exhaust gas from the heat engine 7 to the solid-oxide fuel cell 10 (direction D1 in FIG. 1) and the reactor 3 (direction D2 in FIG. 1), wherein divided flow rates of exhaust gas to the solid-oxide fuel cell 10 and the reactor 3 are adjusted by instruction from the later-described controller 30. Incidentally, the second valve V2 corresponds to 'second flow rate adjusting device' described in claims.

The solid-oxide fuel cell 10 generates power by the electrochemical reaction represented by the following Expressions (1) and (2) between hydrogen (fuel) supplied from the reactor 3 to a fuel electrode and oxygen (air) supplied from an air supply device (not shown), such as a compressor, to an air electrode.

(Air Electrode)(½).$O_2$+$2e^-$→$O_2^-$     Expression (1)

(Fuel Electrode)$H_2$+$O_2^-$→$H_2O$+$2e^-$     Expression (2)

Figure 2A:
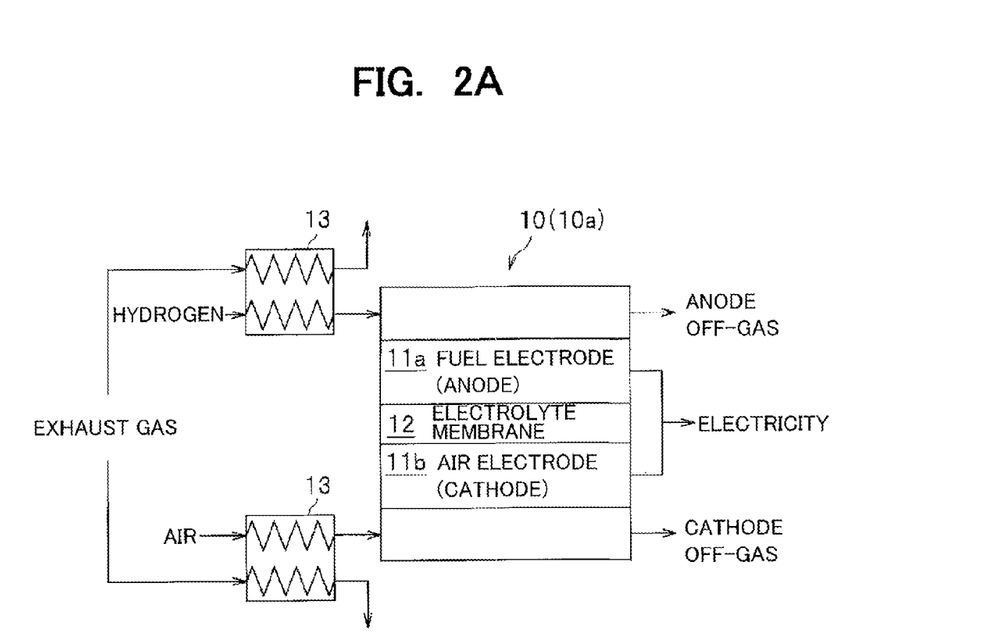
FIG. 2A is a schematic diagram for illustration of the solid-oxide fuel cell (single cell) of the power conversion system.
Figure 2B:
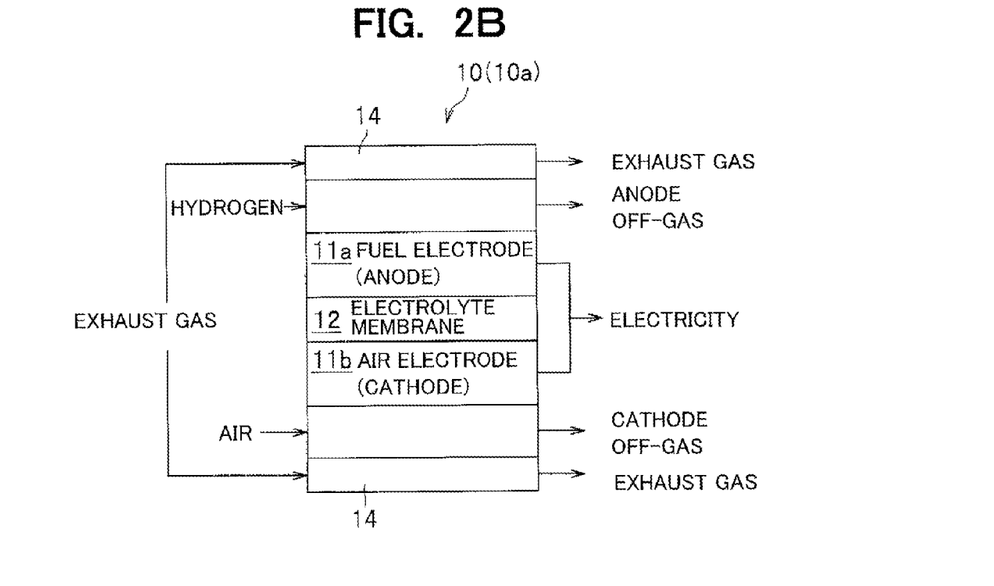
FIG. 2B is a schematic diagram showing a modified example of the solid-oxide fuel cell (single cell) in FIG. 2A.

FIG. 2A referred to in the following is a schematic diagram for illustration of the solid-oxide fuel cell (single cell) of the power conversion system related to the present embodiment. FIG. 2B is a schematic diagram showing a modified example of the solid-oxide fuel cell (single cell) in FIG. 2A.

As shown in FIG. 2A, the single cell 10a of the solid-oxide fuel cell 10 is provided with an electrolyte membrane 12 and an air electrode (cathode) 11b and fuel electrode (anode) 11a which sandwich the electrolyte membrane 12. The solid-oxide fuel cell 10 (fuel cell stack), shown in FIG. 1, is constructed by multiple lamination of such single cells 10a. Though not shown, a single cell 10a can further be provided with a conductive support body, which has a flow passage, not shown, for hydrogen (hydrogen rich gas) as fuel and contacts with the electrolyte membrane 12 to serve also as a part or the whole of the fuel electrode 11a, and an electricity collecting member (inter-connector), which is arranged on the opposite surface side of this support body, the opposite surface side being opposite to the electrolyte membrane 12. Incidentally, air is supplied to the air electrode 11b side by the air supply device, as described above. In general, hydrogen is excessively supplied, however, it is desirable that hydrogen is supplied, matching with a predetermined external load to thereby reducing waste of hydrogen.

The electrolyte membrane 12 can be made, for example, from a dense ceramic containing partially-stabilized or totally stabilized $ZrO_2$ that contains rare earth element, such as yttrium.

The air electrode 11b can be made, for example, from a porous ceramic, such as lanthanum-manganese based oxide or lanthanum-iron based oxide, which are transition metal based perovskite-type oxide. The fuel electrode 11a and the support body (not shown) can be made, for example, from porous ceramic containing nickel oxide and/or nickel and yttria stabilized zirconia YSZ.

The above-described electricity collecting member (not shown) can be made, for example, from dense a ceramic containing lanthanum chromite.

Incidentally, a single cell 10a used in the present invention is not limited thereto, and a known one can be used, as appropriate.

As shown in FIG. 2A, hydrogen (hydrogen rich gas) and air having been heated by the high temperature exhaust gas supplied from the heat engine 7 (see FIG. 1) are supplied respectively to the fuel electrode 11a side and the air electrode 11b side of the single cell 10a, and the solid-oxide fuel cell 10 is thereby warmed up as described later.

Incidentally, heating of hydrogen (hydrogen rich gas) and air by exhaust gas is performed, as shown in FIG. 2A, via a heat exchanger 13, however, it is possible, as shown in FIG. 2B, to provide flow passages 14, in which exhaust gas flows, at the single cell 10a to thereby heat hydrogen (hydrogen rich gas) and air. Further, according to the invention, it is also possible to directly heat the single cell 10a itself by exhaust gas.

The reactor 3 produces hydrogen and a dehydrogenation product from an organic hydride by dehydrogenation reaction. The organic hydride is transferred into the reactor 3 from an organic hydride tank 2 via a fourth valve V4. The fourth valve V4 is a flow rate adjusting valve, which is provided at a pipe connecting the organic hydride tank 2 and the reactor 3. The open degree of the fourth valve V4 is adjusted by an instruction from the later-described controller 30. The fourth valve V4 corresponds to 'fourth flow rate adjusting device' described in claims.

The organic hydride is a hydride of an aromatic hydrocarbon, and is reserved such as to enable dehydrogenation by that hydrogen is added to carbon-carbon double bond of the aromatic hydrocarbon.

This organic hydride can be, for example, a monocyclic hydrogenated aromatic compound such as cyclohexane, methyl cyclohexane, or dimethyl cyclohexane, a bicyclic hydrogenated aromatic compound such as tetralin, decalin, and methyl decalin, or a tricyclic hydrogenated aromatic compound such as tetradecahydroanthracene. When heated in the presence of a certain catalyst, the organic hydride is decomposed into hydrogen and the above-described aromatic hydrocarbon, which is the dehydrogenation product of the organic hydride. Incidentally, the dehydrogenation product of the organic hydride can be, for example, benzene, toluene, xylene, mesitylene, naphthalene, methylnaphthalene, or anthracene.

The organic hydride will be described below in more details, with an example of methyl cyclohexane $[C_6H_{11}(CH_3)]$ described above. As represented by the following Expression (3), methyl cyclohexane is decomposed into hydrogen $(H_2)$ and toluene $[C_6H_5(CH_3)]$ as a dehydrogenation product of the organic hydride.

$$C_6H_{11}(CH_3) \rightarrow C_6H_5(CH_3) + 3H_2 - 205 \text{ kJ} \qquad \text{Expression (3)}$$

The reaction represented by Expression (3) is an endothermic reaction, which is desirably performed with heat because a heat of 205 kJ is absorbed when 3 moles of hydrogen are produced from 1 mole of methyl cyclohexane. Incidentally, in the present embodiment, with an assumption that methyl cyclohexane is used as the organic hydride, the heating temperature is set to approximately 250-400° C., however, this heating temperature can be set, as appropriate, corresponding to the kind of the organic hydride that is used.

Figure 3A:
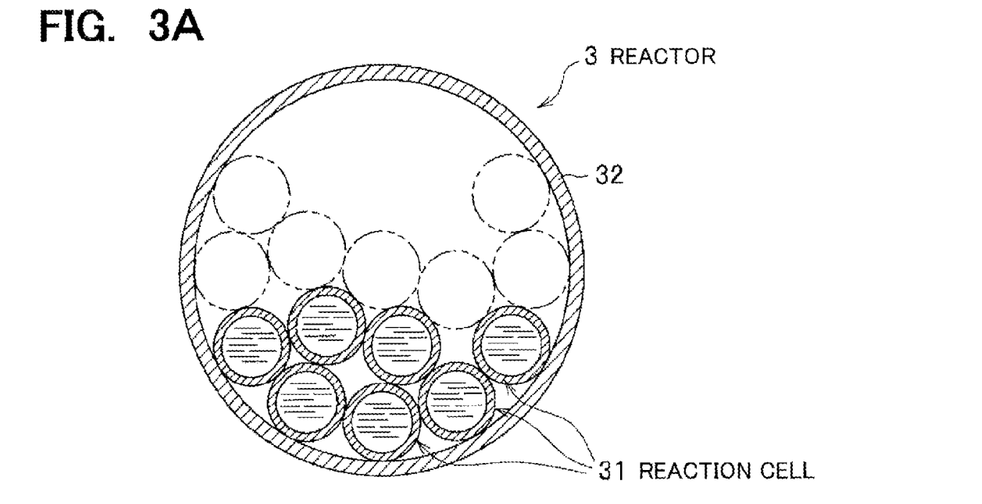
FIG. 3A is a cross-sectional view of a reactor of the power conversion system.
Figure 3B:
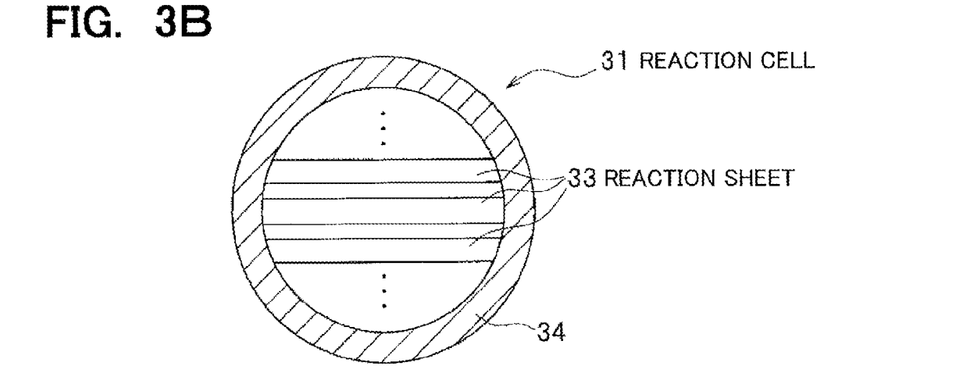
FIG. 3B is a cross-sectional view of a reaction cell built in the reactor.
Figure 3C:
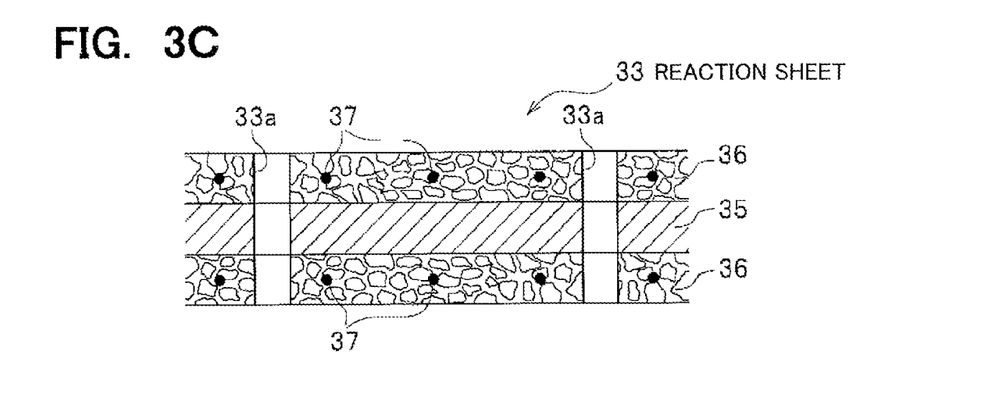
FIG. 3C is a cross-sectional view of a reaction sheet built in the reaction cell.

FIG. 3A, referred to in the following, is a cross-sectional view of a hydrogen producing device, FIG. 3B is a cross-sectional view of a reaction cell built in the hydrogen producing device, and FIG. 3C is a cross-sectional view of a reaction sheet built in the reaction cell.

As shown in FIG. 3A, the reactor 3 is provided with plural reaction cells 31 with a cylindrical outer shape, and a first casing 32 with a cylindrical shape hosing these reaction cells 31. The organic hydride (for example, methyl cyclohexane) reserved in the above-described organic hydride tank 2 is transferred into each reaction cell 31.

Exhaust gas of the heat engine 7 transferred via the second valve V2 flows through the gasp formed between reaction cells 31, and in addition, as described later, high temperature cathode off-gas exhausted from the solid-oxide fuel cell 10 flows through the gaps.

The first casing 32 and the second casing 34, described later, are formed from metal (for example, SUS) so that the thermal conductivity becomes high. The shapes of the first casing 32 and the second casing 34 are not limited to a cylindrical shape, and may be, for example, a rectangular tube shape, or a polygonal tube shape.

As shown in FIG. 3B, a reaction cell 31 is provided with laminated plural reaction sheets 33 and a second casing 34 housing the plural reaction sheets 33.

As shown in FIG. 3C, each reaction sheet 33 is provided with a metal foil 35 serving as a base, porous layers 36 formed on the both surfaces of the metal foil 35, and catalyst 37 held by the porous layers 36. That is, each reaction sheet 33 is in a three-layered structure with lamination of the porous layer 36 holding the catalyst 37, the metal foil 35, and the porous layer 36 holding the catalyst 37, which are laminated in this order.

A gap is formed between the reaction sheets 33, 33 neighboring with each other in the thickness direction, wherein the organic hydride and produced hydrogen and the dehydrogenation product (for example, toluene) can flow through the gap.

As each reaction sheet 33 is in a sheet form, the thermal capacity thereof is small, heat quickly transfers in the reaction sheet 33, and the temperature of the catalyst 37 quickly rises to a temperature at which the catalyst function satisfactorily works. Thus, the efficiency of decomposition reaction that decomposes the organic hydride into hydrogen and the dehydrogenation product is high.

Further, each reaction sheet 33 is provided with plural penetration holes 33a. Thus, the heat of hydrogen combustion gas satisfactorily transfers in the thickness direction, and the organic hydride, the produced hydrogen, and the produced dehydrogenation product satisfactorily flow through also in the thickness direction.

The metal foil 35 is formed, for example, by an aluminum foil, and the thickness is made approximately 50-200 μm. On the other hand, it is also possible to provide a porous layer as a base, instead of the metal foil 35, and make the whole reaction sheet 33 have a porous structure.

The porous layer 36 is a layer for holding the catalyst 37 and has plural thin holes through which the organic hydride, the produced hydrogen and the produced dehydrogenation product can flow. This porous layer 36 can be formed, for example, by an oxide based on aluminum, titania, silica, or zirconia.

The catalyst 37 is a catalyst for discomposing the organic hydride to produce hydrogen and the dehydrogenation product. Such a catalyst 37 contains at least one selected from, for example, platinum, nickel, palladium, rhodium, iridium, ruthenium, molybdenum, rhenium, tungsten, vanadium, osmium, chrome, cobalt, iron, and the like.

Incidentally, exhaust gas having flowed through the reactor 3 (see FIG. 1) flows through a certain pipe (not shown) connected to the reactor 3 and is exhausted outside.

Returning to FIG. 1, the reactor 3 is connected with the solid-oxide fuel cell 10 by a certain pipe, and high temperature cathode off-gas flows through the gaps formed between the reaction cells 31 (see FIG. 3A) via the first valve V1 arranged at this pipe.

The first valve V1 is a three-way switching valve that switches, upon instruction from the later-described controller 30, the direction of the flow of cathode off-gas from the solid-oxide fuel cell 10, between the outdoor side (direction D3 in FIG. 1) and the reactor 3 side (direction D4 in FIG. 1), and corresponds to 'first flow rate adjusting device' described in claims.

The separating device 4 separates out hydrogen produced by the reactor 3 and supplies hydrogen rich gas as fuel to the solid-oxide fuel cell 10. The separating device 4 is arranged to cool a mixture of high temperature dehydrogenation product (for example, toluene) of the organic hydride (for example, methyl cyclohexane) transferred out from the reactor 3 to a temperature lower than the boiling point of the dehydrogenation product (lower than bp. 111° C. in case of toluene), and thereby perform gas-liquid separation into the dehydrogenation product as liquid and hydrogen as gas. The separating device 4 transfers out the dehydrogenation product to the dehydrogenation product tank 1 to reserve the dehydrogenation product. As a method of transferring out the dehydrogenation product to the dehydrogenation product tank 1, arrangement may be made such that a pump (not shown) transports the dehydrogenation product, or the dehydrogenation product flows down by gravity to a dehydrogenation product tank 1 disposed at a height lower than the separating device 4.

Further, the separating device 4 is arranged to supply the separated hydrogen (hydrogen rich gas) to the fuel electrode 11*a* (see FIG. 2A) side of the solid-oxide fuel cell 10 via a fifth valve V5. Incidentally, the fifth valve V5 is a flow rate adjusting valve that is arranged at the pipe connecting the separating device 4 and the solid-oxide fuel cell 10, and adjusts the open degree of the fifth valve V5 is adjusted by an instruction from the later-described controller 30. The fifth valve V5 corresponds to 'fifth flow rate adjusting device' described in claims. Incidentally, the above-described term 'hydrogen rich gas' means that a small amount of dehydrogenation product (for example, toluene) is mixed in the hydrogen separated by the separating device 4. Herein, the words 'a small amount of dehydrogenation product' includes the meaning of a tiny amount of dehydrogenation product below a quantitative limit.

The separating device 4 in the present embodiment performs separation into hydrogen and the dehydrogenation product (for example, toluene) by air cooling, and is provided with a radiator fan (not shown) for promoting cooling by air cooling. Incidentally, the separation method is not limited thereto, and for example, a method of separating hydrogen by a pressure swing adsorption device or a hydrogen permeable film (Pd film, etc.) that selectively permeates hydrogen may be adopted.

Further, the dehydrogenation product (for example, toluene) reserved in the dehydrogenation product tank 1 can be used as a fuel to be supplied to the heat engine 7. Transportation of the dehydrogenation product to the heat engine 7 can be performed by a pump provided at the pipe connecting the dehydrogenation product tank 1 and the heat engine 7, or a pump provided inside the dehydrogenation product tank 1. Incidentally, toluene is a fuel that is high-octane and has a high anti-knocking characteristic. Accordingly, with toluene, when a spark ignition engine is used as the heat engine 7, the heat engine 7 can be operated with a high compression ratio so that the power generation efficiency of the heat engine 7 is improved.

The controller 30 (see FIG. 1) for electronic control of the power conversion system S will be described below.

The controller 30 includes a CPU, a ROM, a RAM, various interfaces, an electronic circuit, and the like. According to a program stored in the controller 30, the controller 30 integrally controls the solid-oxide fuel cell 10, the heat engine 7, the generator 15, and the like constructing the power conversion system S in the present embodiment. Further, the controller 30 controls the operation of the first valve V1, the second valve V2, the third valve V3, the fourth valve V4, and the fifth valve V5, based on temperatures detected by the temperature sensors T1, T2, T3, T4, T5, T6, and T7, according to a later-described procedure.

As, shown in FIG. 1, the temperature sensor T1 detects the temperature (for example, the temperature of the single cell 10*a*) of the solid-oxide fuel cell 10, and corresponds to 'first temperature detecting device' described in claims. The temperature sensor T2 detects the temperature (for example, the temperature of a reaction cell 31) of the reactor 3, and corresponds to 'second temperature detecting device' described in claims. The temperature sensor T3 is arranged on the upstream side of the first valve V1 at the pipe connecting the solid-oxide fuel cell 10 and the reactor 3, and detects the temperature of cathode off-gas transferred out from the solid-oxide fuel cell 10 to the reactor 3. The temperature sensor T3 corresponds to 'first temperature detecting device' described in claims. The temperature sensor T4 is arranged on the downstream side of the second valve V2 at the pipe connecting the heat engine heat engine 7 and the solid-oxide fuel cell 10, and detects the temperature of exhaust gas transferred out from the heat engine 7 to the solid-oxide fuel cell 10. The temperature sensor T5 is arranged on the downstream side of the second valve V2 at the pipe connecting the heat engine 7 and the reactor 3, and detects the temperature of exhaust gas transferred from the heat engine 7 to the reactor 3. The temperature sensor T6 is arranged on the upstream side of the fifth valve V5 at the pipe connecting the separating device 4 and the solid-oxide fuel cell 10, and detects the temperature of the hydrogen rich gas transferred out from the separating device 4 to the solid-oxide fuel cell 10. The temperature sensor T7 is arranged on the upstream side of the fourth valve V4 at the pipe connecting the organic hydride tank 2 and the reactor 3, and detects the temperature of the organic hydride transferred out from the organic hydride tank 2 to the reactor 3.

Further, the controller 30 detects the pressure of the hydrogen rich gas transferred out from the separating device 4 by a pressure sensor P, and detects the concentration of the dehydrogenation product (for example, toluene) by a concentration sensor C. The pressure sensor P is arranged on the upstream side of the fifth valve V5 at the pipe connecting the separating device 4 and the solid-oxide fuel cell 10. The concentration sensor C is arranged at the pipe connecting the separating device 4 and the dehydrogenation product tank 1. Incidentally, the concentration sensor C in the present embodiment detects the concentration of dehydrogenation product in the mixture of dehydrogenation product transferred out from the separating device 4 to the dehydrogenation product tank 1 and organic hydride, on which reaction has not yet occurred (decomposition having not yet occurred), the organic hydride being slightly contained in the transferred dehydrogenation product. The concentration sensor C is configured with a densitometer, a permittivity meter, or the like.

In the following, the procedure that the controller 30 executes in warming up the solid-oxide fuel cell 10 and the reactor 3 will be described. In the present embodiment, the temperature of the solid-oxide fuel cell 10 during power generation is set to 600-1000° C., and the temperature of the reactor 3 is set to 250-400° C. on the assumption that, as described above, hydrogen and toluene (dehydrogenation product) are produced from methyl cyclohexane (organic hydride) by the reactor 3.

In the following, warming-up operation of raising, by exhaust gas of the heat engine 7, the temperatures of the solid-oxide fuel cell 10 and the reactor 3 such that the temperatures become in the above-described respective temperature ranges will be described. The operation states of warming-up of the solid-oxide fuel cell 10 and the reactor 3 can be six kinds of patterns from operation state 1 to operation state 6, shown in the following Table 1.

Herein, in Table 1, TR represents a threshold value (determination reference value) for specifying the operation temperature of the reactor 3, which produces hydrogen and toluene from methyl cyclohexane, and is a preset value in the above-described range 250-400° C. TFC represents a threshold value (determination reference value) for specifying the operation temperature of the solid-oxide fuel cell 10 in power generation, and is a preset value in the above-described range 600-1000° C. LR represents the flow rate of exhausted gas supplied from the heat engine 7 to the reactor 3 in such a manner that the temperature by the temperature sensor T2 (the second temperature detecting device), shown in FIG. 1, becomes at lowest the temperature TR. LFC represents the flow rate of exhaust gas supplied from the heat engine 7 to the solid-oxide fuel cell 10 in such a manner that the temperature by the temperature sensor T1 (the first temperature detecting device), shown in FIG. 1, becomes at lowest the temperature TFC.

warming-up, however, the temperature of this air is desirably not lower than TFC. Incidentally, it is also possible not to supply air during warming-up.

Still further, as the temperature (temperature detected by the temperature sensor T2) of the reactor 3 is lower than TR, the controller 30 determines that the temperature of the

TABLE 1

| Operation State | Reactor Temperature (Temperature by T2) | Fuel Cell Temperature (Temperature by T1) | Fuel Cell Off-Gas Temperature (Temperature by T3) | Second Valve | First Valve | Fourth Valve | Fifth Valve | Third Valve |
|---|---|---|---|---|---|---|---|---|
| 1 | Lower Than TR*1 | Lower Than TFC*2 | Lower Than TR | Divide Flow with Flow Rate LFC in Direction D1 and Flow Rate LR in Direction D2 *L3 | in Direction D3 (To Outside) | Closed | Closed | Flow Rate during Warming Up |
| 2 | Lower Than TR | Lower Than TFC | Reached TR | Divide Flow with Flow Rate LFC in Direction D1 and Flow Rate LR in Direction D2 *L3 | in Direction D4 (To Reactor) | Closed | Closed | Flow Rate during Warming Up |
| 3 | Lower Than TR | Reached TFC | Lower Than TR | Divide Flow with Flow Rate Lower Than LFC in Direction D1 and Flow Rate Higher than LR in Direction D2 | in Direction D3 (To Outside) | Closed | Closed | Flow Rate during Warming Up |
| 4 | Lower Than TR | Reached TFC | Reached TR | Divide Flow with Flow Rate Lower than LFC in Direction D1 and Flow Rate Higher Than LR in Direction D2 | in Direction D4 (To Reactor) | Closed | Closed | Flow Rate during Warming Up |
| 4 | Reached TR | Lower Than TFC | Lower Than TR | Divide Flow with Flow Rate Higher than LFC in Direction D1 and Flow Rate Lower than LR in Direction D2 | in Direction D3 (To Outside) | Closed | Closed | Flow Rate during Warming Up |
| 6 | Reached TR | Lower Than TFC | Reached TR | Divide Flow with Flow Rate Further Higher than LFC in Direction D1 and Flow Rate Further Lower than LR in Direction D2 | in Direction D4 (To Reactor) | Closed | Closed | Flow Rate during Warming Up |

*1 TR: Preset Operation Temperature of Reactor (Threshold)
*2 TFC: Preset Operation Temperature of Fuel Cell (Threshold)
*3 D1 (see FIG. 2), D2 (see FIG. 1)
LFC: Flow Rate Making Temperature by T4 (see FIG. 1) At Lowest Temperature TFC
LR: Flow Rate Making Temperature by T5 (see FIG. 1) At Lowest Temperature TR (Operation State 1)

As shown in Table 1, in the operation state 1, if the temperature (temperature detected by the temperature sensor T2) of the reactor 3 is lower than TR; the temperature (temperature detected by the temperature sensor T1) of the solid-oxide fuel cell 10 is lower than TFC; and the temperature (temperature detected by the temperature sensor T3) of off-gas (cathode off-gas) from the solid-oxide fuel cell 10 is lower than TR, the controller 30 controls the dividing flow rates at the second valve V2. Concretely, as shown in FIG. 1, the controller 30 controls the dividing flow rates at the second valve V2 so that exhaust gas from the heat engine 7 is divided to flow at the flow rate LFC in direction D1 (solid-oxide fuel cell 10 side), and at the flow rate LR in the direction D2 (reactor 3 side). Thus, the solid-oxide fuel cell 10 and the reactor 3 are heated by the exhaust gas and the temperatures thereof begin to rise.

Further, as the temperature (temperature detected by the temperature sensor T1) of the solid-oxide fuel cell 10 is lower than TFC, the controller 30 determines that the temperature of the solid-oxide fuel cell 10 has not yet reached a temperature for making the solid-oxide fuel cell 10 perform power generation, and closes the fifth valve V5 not to supply hydrogen to the solid-oxide fuel cell 10. Incidentally, in the present embodiment, setting is made such as to supply air to the solid-oxide fuel cell 10 during reactor 3 has not yet reached a temperature for making the reactor 3 produce hydrogen from the organic hydride, and closes the fourth valve V4 not to supply the organic hydride from the organic hydride tank 2 to the reactor 3.

Still further, as the temperature (the temperature detected by the temperature sensor T3) of off-gas (cathode off-gas) from the solid-oxide fuel cell 10 is lower than TR, the controller 30 determines that the temperature of the cathode off-gas is lower than the temperature (temperature TR at lowest) of exhaust gas transferred to the reactor 3 via the second valve V2, and the controller 30 sets (switches) the first valve V1 so that the cathode off-gas flows in direction D3 (to outside).

Yet further, as the temperature (the temperature detected by the temperature sensor T1) of the solid-oxide fuel cell 10 is lower than TFC and the temperature (the temperature detected by the temperature sensor T2) of the reactor 3 is lower than TR, the controller 30 determines that the solid-oxide fuel cell 10 and the reactor 3 are in warming-up operation, adjusts the open degree of the third valve V3 so that the flow rate of fuel transferred out from the fuel tank 5 to the heat engine 7 becomes a preset flow rate to be applied during warming up.

(Operation State 2)

As shown in Table 1, the operation state 2 is a state that the temperature of the solid-oxide fuel cell 10 and the temperature of the reactor 3 are in the same conditions as those in the above-described operation state 1, and the temperature (the temperature detected by the temperature sensor T3) of the off-gas (cathode off-gas) from the solid-oxide fuel cell 10 has reached TR.

In this situation, the controller 30 determines that, similarly to the operation state 1, the temperature of the solid-oxide fuel cell 10 has not yet reached the temperature for making the solid-oxide fuel cell 10 perform power generation and the temperature of the reactor 3 has not yet reached the temperature for making the reactor 3 produce hydrogen from the organic hydride. Accordingly, the controller 30 determines that warming-up operation is currently performed, and performs control such that the second valve V2, the third valve V3, the fourth valve V4, and the fifth valve V5 operate similarly to the operation state 1.

Further, as the temperature (the temperature detected by the temperature sensor T3) of the off-gas (cathode gas) from the solid-oxide fuel cell 10 has reached TR, the controller 30 determines that the reactor 3 can be heated by this cathode off-gas. Accordingly, the controller 30 sets (switches) the first valve V1 so that the cathode off-gas flows in direction D4 (to the reactor 3 side).

In this situation, the reactor 3 is heated by exhaust gas, whose temperature is at lowest TR, from the heat engine 7, and also by the cathode off-gas, whose temperature has reached TR though not yet reached TFC. That is, the reactor 3 is heated such that the temperature thereof more quickly reaches the operation temperature.

(Operation State 3)

As shown in Table 1, in the operation state 3, although the temperature (the temperature detected by the temperature sensor T2) of the reactor 3 is lower than TR and the temperature (the temperature detected by the temperature sensor T1) of the solid-oxide fuel cell 10 has reached TFC by being heated by exhaust gas, the solid-oxide fuel cell 10 has not yet started power generation. Accordingly, the temperature (the temperature detected by the temperature sensor T3) of the off-gas (cathode off-gas) from the solid-oxide fuel cell 10 is lower than TR.

In this situation, the controller 30 controls the second valve V2, and thereby divides the flow of exhaust gas from the heat engine 7 such that the flow rate in direction D1 (to the solid-oxide fuel cell 10 side) becomes lower than the flow rate LFC and the flow rate in direction D2 (to the reactor 3 side) becomes higher than the flow rate LR. That is, the flow rate of the exhaust gas supplied to the reactor 3 becomes high so that the warming-up time of the reactor 3 can be shortened and the time from startup until the time when power generation with hydrogen obtained from the organic hydride becomes possible is shortened.

Further, as the temperature (the temperature detected by the temperature sensor T3) of the off-gas (cathode off-gas) from the solid-oxide fuel cell 10 is lower than TR, the controller 30 sets (switches) the first valve V1 so that the cathode off-gas flows in direction D3 (to outside).

Incidentally, the third valve V3, the fourth valve V4, and the fifth valve V5 are controlled such as to operate similarly to the operation state 1.

(Operation State 4)

As shown in Table 1, in the operation state 4, the temperature (the temperature detected by the temperature sensor T2) of the reactor 3 is lower than TR; the temperature (the temperature detected by the temperature sensor T1) of the solid-oxide fuel cell 10 has reached TFC by the heat of exhaust gas; and the temperature (the temperature detected by the temperature sensor T3) of the off-gas from the solid-oxide fuel cell 10 has reached TR. Incidentally, although power generation by the solid-oxide fuel cell 10 in the operation state 4 has not yet started, the temperature of the off-gas (the cathode off-gas) from the solid-oxide fuel cell 10 has reached TR. This is because it is assumed that air having been supplied to the solid-oxide fuel cell 10 is heated by exhaust gas which heats the solid-oxide fuel cell 10, the exhaust gas flowing from the heat engine 7. Incidentally, start of power generation by the solid-oxide fuel cell 10 refers to a time when the temperature of the solid-oxide fuel cell 10 has become in the above-described temperature range enabling the solid-oxide fuel cell 10 to generate power, in other words, a time when power supply to an external load has become possible.

In such an operation state 4, as the temperature (the temperature detected by the temperature sensor T3) of the off-gas (cathode off-gas) from the solid-oxide fuel cell 10 has reached TR, the controller 30 sets (switches) the first valve V1 so that the cathode off-gas flows in direction D4 (to the reactor 3). Accordingly, the time for warming up the reactor 3 can be shortened, and the time from startup until the time when power generation by the solid-oxide fuel cell 10 becomes possible can be shortened.

Incidentally, the second valve V2, the third valve V3, the fourth valve V4, and the fifth valve V5 are controlled such as to operate similarly to the operation state 3.

(Operation State 5)

As shown in Table 1, in the operation state 5, the temperature (the temperature detected by the temperature sensor T2) of the reactor 3 has reached TR; the temperature (the temperature detected by temperature sensor T1) of the solid-oxide fuel cell 10 is lower than TFC; and the temperature (the temperature detected by the temperature sensor T3) of the off-gas (cathode off-gas) from the solid-oxide fuel cell 10 is lower than TR.

In such an operation state 5, the controller 30 controls the second valve V2 to thereby divide the flow of exhaust gas from the heat engine 7 such that the flow rate in direction D1 (to the solid-oxide fuel cell 10 side) is higher than the flow rate LFC, and the flow rate in direction D2 (to the reactor 3 side) is lower than the flow rate LR. That is, the flow rate of exhaust gas supplied to the solid-oxide fuel cell 10 becomes high so that the warming-up time of the solid-oxide fuel cell 10 can be shortened and the time from startup until the time when power generation by the solid-oxide fuel cell 10 becomes possible can be shortened.

The first valve V1, the third valve V3, the fourth valve V4, and the fifth valve V5 are controlled such as to operate similarly to the operation state 3.

(Operation State 6)

As shown in Table 1, in the operation state 6, the temperature (the temperature detected by the temperature sensor T2) of the reactor 3 has reached TR, the temperature (the temperature detected by the temperature sensor T1) of the solid-oxide fuel cell 10 is lower than TFC, and the temperature (the temperature detected by the temperature sensor T3) of the off-gas (cathode gas) from the solid-oxide fuel cell 10 has reached TR.

In such an operation state 6, the controller 30 sets (switches) the first valve V1 such that the cathode off-gas flows in direction D4 (to the reactor 3 side). Accordingly, heat supplied to the reactor 3 increases, and in addition, the temperature of the reactor 3 has already reached TR. Therefore, the controller 30 can control the second valve V2 to divide the flow of the exhaust gas from the heat engine 7, making the flow rate in direction D1 (to the solid-oxide fuel cell 10 side) become further higher, and making the flow rate in direction D2 (to the reactor 3 side) become further lower than LR. Thus, the flow rate of the exhaust gas supplied to the solid-oxide fuel cell 10 side becomes higher than in the operation state 5 so that the warming-up time of the solid-oxide fuel cell 10 can be further shortened and the time from startup until the time when power generation by the solid-oxide fuel cell 10 becomes possible can be further shortened.

Though not described in Table 1, warming up of the solid-oxide fuel cell 10 and the reactor 3 is completed when the temperature (the temperature detected by the temperature sensor T2) of the reactor 3 has reached TR, the temperature (the temperature detected by the temperature sensor T1) of the solid-oxide fuel cell 10 has reached TFC, and the temperature (the temperature detected by the temperature sensor T3) of the off-gas (cathode off-gas) of the solid-oxide fuel cell 10 has reached TR.

When warming-up operation is completed, the controller 30 sets the open degree of the fourth valve V4 to a certain value, and supplies the organic hydride reserved in the organic hydride tank 2 to the reactor 3. As a result, the reactor 3 produces hydrogen and the dehydrogenation product from the organic hydride.

Further, the controller 30 set the open degree of the fifth valve V5 to a certain value, and thereby, hydrogen (hydrogen rich gas), which has been separated from the dehydrogenation product by the separating device 4, is transferred out to the fuel electrode 11a (see FIG. 2A) of the solid-oxide fuel cell 10. Thus, the solid-oxide fuel cell 10 starts power generation, corresponding to the external load.

In the following, the operation of the power conversion system S after completion of warming-up operation will be described.

Figure 4:
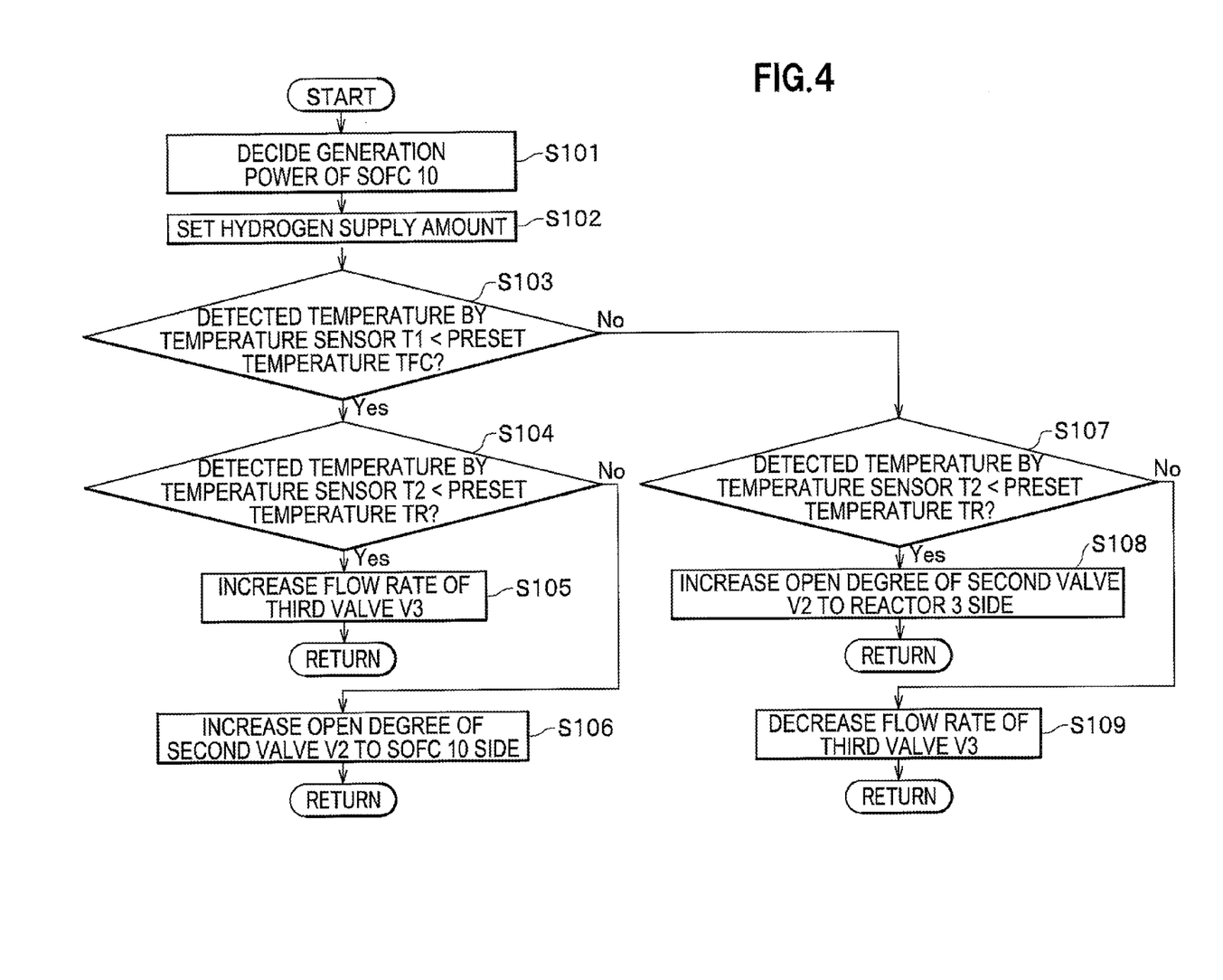
FIG. 4 is a flowchart for illustration of the operation after completion of warming-up operation of the power conversion system according to the above-described embodiment of the present invention.

FIG. 4 referred to is a flowchart for illustration of the operation of the power conversion system in the present embodiment of the invention after completion of warming-up operation. Incidentally, FIG. 4 shows a subroutine that is called and executed anytime, as necessary, in execution of a main flow, and the process returns to a certain flow (not shown) after this subroutine is executed.

On the power conversion system S (see FIG. 1) having transitioned from the warming-up operation into the normal operation, a generation power to be generated by the solid-oxide fuel cell (SOFC, this description being omitted hereinafter) 10 is decided first as shown in FIG. 4, corresponding to the magnitude of the external load electrically connected to the solid-oxide fuel cell 10 (see FIG. 1) (step S101), and then the controller 30 (see FIG. 1) sets an amount of hydrogen to be supplied to the solid-oxide fuel cell 10, based on the decided generation power (hereinafter, referred to also as 'target generation power') (step S102). Concretely, if the target generation power is higher than the measured value of the current generation power of the solid-oxide fuel cell 10, the controller 30 increases the supply amount of the organic hydride to the above-described reactor 3 and also increases the supply amount of hydrogen to the solid-oxide fuel cell 10, by the fourth valve V4 (see FIG. 1) and the fifth valve V5. If the target generation power is lower than the measured value of the current generation power of the solid-oxide fuel cell 10, the controller 30 decreases the supply amount of the organic hydride to the above-described reactor 3 and also decreases the supply amount of hydrogen to the solid-oxide fuel cell 10, by the fourth valve V4 (see FIG. 1) and the fifth valve V5. Incidentally, excess or deficiency of power supply to the external load can be absorbed by providing a secondary battery.

Then, the controller 30 determines whether or not the temperature (the temperature detected by the temperature sensor T1) of the solid-oxide fuel cell 10 is lower than the above-described TFC (step S103). In this situation, if it is determined that this temperature is lower than the above-described TFC (Yes in step S103), as the temperature of the solid-oxide fuel cell 10 is low, the controller 30 then determines whether or not the temperature (the temperature detected by the temperature sensor T2) of the reactor 3 is lower than the above-described TR (step S104). In this situation, if it is determined that this temperature is lower than the above-described TR (Yes in step S104), the controller 30 executes step S105 of increasing the flow rate of the third valve V3, thereby raises the temperatures of the solid-oxide fuel cell 10 and the reactor 3, and the process returns to the certain flow.

If the temperature (the temperature detected by the temperature sensor T2) of the reactor 3 is higher than or equal to the above-described TR (No in step S104), then the controller 30 controls the second valve V2 to thereby divide exhaust gas such that the flow rate in direction D1 (to the solid-oxide fuel cell 10 side) becomes higher than the above-described LFC (step S106). That is, by increasing the flow rate of exhaust gas to be supplied to the solid-oxide fuel cell 10, the temperature of the solid-oxide fuel cell is raised, and the process returns to the certain flow.

If it is determined that the temperature (the temperature detected by the T1) of the solid-oxide fuel cell 10 is higher than or equal to the above-described TFC (No in step S103), as the temperature of the solid-oxide fuel cell 10 is high, the controller 30 executes step S107 to determine whether or not the temperature (the temperature detected by the temperature sensor T2) of the reactor 3 is lower than the above-described TR. In this situation, if this temperature is lower than the above-described TR (Yes in step S107), the controller 30 controls the second valve V2 to divide the exhaust gas such that the flow rate in direction D2 (to the reactor 3 side) becomes higher than the above-described flow rate LR (step S108). That is, by increasing the flow rate of the exhaust gas to be supplied to the reactor 3, the temperature of the reactor 3 is raised, and the process returns to the certain flow.

If it is determined that the temperature (the temperature detected by the temperature sensor T2) of the reactor 3 is higher than or equal to the above-described TR in step S107 (No in step S107), then the controller 30 executes step S109 of decreasing the flow rate at the third valve V3, thereby drops the temperatures of the solid-oxide fuel cell 10 and the reactor 3, and the process returns to the certain flow.

The controller 30 in the present embodiment controls the first valve V1, the second valve V2, and the third valve V3 by the above-described procedure also during normal operation after warming-up of the solid-oxide fuel cell 10 and the reactor 3, thereby using exhaust gas of the heat engine 7, and thus maintains the temperatures of the solid-oxide fuel cell 10 and the reactor 3 to be in the above-described appropriate ranges.

By the above-described power conversion system S, as it is possible to heat the solid-oxide fuel cell 10 and the reactor 3 by supplying exhaust gas from the heat engine 7 under control by the controller 30, the ratio of the amount of power generated by the solid-oxide fuel cell 10, to the total amount of power generated by the power conversion system S including the amount of power generated by the heat engine 7, increases, and the system efficiency is thereby improved.

Further, by this power conversion system S, as it is possible, as described above, to maintain the temperatures of the solid-oxide fuel cell 10 and the reactor 3 in the above-described appropriate ranges, the solid-oxide fuel cell 10 and the reactor 3 can be operated stably with a high efficiency.

Further, by this power conversion system S, the solid-oxide fuel cell 10 and the reactor 3 are controlled, with the power generated by power conversion system S as a target generation power, and power generation matching the demand is thereby realized.

Still further, by this power conversion system S, in case that hydrogen reserved in organic hydride is derived from natural energy, the amount of emission of $CO_2$ from the power conversion system S can be reduced, in comparison with a case of hydrogen derived from the combustion energy of fossil fuel.

An embodiment of the present invention has been described above, however, the invention is not limited thereto and can be carried out in various embodiments.

In the foregoing embodiment, an arrangement is made such that, based on temperatures detected by the fourth temperature sensor T4 and the fifth temperature sensor T5, the controller 30 controls the respective divided flow rates of exhaust gas to the solid-oxide fuel cell 10 and the reactor 3 at the second valve V2 (the second flow rate adjusting device). However, it is also possible to control the respective flow rates of exhaust gas to the solid-oxide fuel cell 10 and the reactor 3 at the second valve V2 (the second flow rate adjusting device), based on the temperature (the temperature detected by the temperature sensor T1) of the solid-oxide fuel cell 10 and the temperature (the temperature detected by the temperature sensor T2) of the reactor.

Yet further, in the foregoing embodiment, if the temperature of the solid-oxide fuel cell 10 has reached TFC when warming-up of the solid-oxide fuel cell 10 and the reactor 3 is completed, as shown in the operations states 3 and 4 in Table 1, hydrogen is not supplied to the solid-oxide fuel cell 10, with the fourth valve V4 and the fifth valve V5 being closed, however, it is also possible according to the invention to generate power by supplying hydrogen to the solid-oxide fuel cell 10 in this situation.

Still further, it is assumed in the foregoing embodiment that an arbitrary value (a certain value) in the range 250-400° C. is selected, as described above, as TR, which is the threshold value specifying the operation temperature of the reactor 3, and an arbitrary value (a certain value) in the range 600-1000° C. is selected, as described above, as TFC, which is the threshold value specifying the operation temperature of the solid-oxide fuel cell 10, however, the invention is not limited thereto, and TR and TFC can be set to respective value ranges having an upper limit and a lower limit with a certain width in the above-described respective ranges.

DESCRIPTION OF REFERENCE SYMBOLS

1: dehydrogenation product tank
2: organic hydride tank
3: reactor
4: separating device
5: fuel tank
7: heat engine
10: solid-oxide fuel cell (SOFC)
10a: single cell
11a: fuel electrode
11b: air electrode
12: electrolyte membrane
15: generator
30: controller
S: power conversion system
T1: temperature sensor (the first temperature detecting device)
T2: temperature sensor (the second temperature detecting device)
T3: temperature sensor (the third temperature detecting device)
T4: temperature sensor
T5: temperature sensor
T6: temperature sensor
T7: temperature sensor
V1: the first valve (the first flow rate adjusting device)
V2: the second valve (the second flow rate adjusting device)
V3: the third valve (the third flow rate adjusting device)
V4: the fourth valve (the fourth flow rate adjusting device)
V5: the fifth valve (the fifth flow rate adjusting device)

The invention claimed is:

1. A power conversion system, comprising:
a solid-oxide fuel cell;
a reactor for producing hydrogen and a dehydrogenation product from an organic hydride by dehydrogenation reaction; and
a heat engine for generating motive power,
the power conversion system separating the hydrogen produced by the reactor, supplying the hydrogen as fuel to the solid-oxide fuel cell, and supplying exhaust heat of the heat engine to both the solid-oxide fuel cell and the reactor; and
a controller configured to:
increase a flow rate of fuel supplied to the heat engine if a temperature of the solid-oxide fuel cell is lower than a predetermined operation temperature of the solid-oxide fule cell and a temperature of the reactor is lower than a predetermined operation temperature of the reactor,
control a flow rate of the exhaust gas from the heat engine such that a flow rate of the exhaust gas from the heat engine to the solid-oxide fuel cell is higher than a flow rate of the exhaust gas from the heat engine to the reactor if a temperature of the reactor is lower than a predetermined operation temperature of the solid-oxide fuel cell and a temperature of the reactor is higher than a predetermined operation temperature of the reactor,
control the flow rate of the exhaust gas from the heat engine such that the flow rate of the exhaust gas from the heat engine to the reactor is higher than the flow rate of the exhaust gas from the heat engine to the solid-oxide fuel cell if a temperature of the solid-oxide fuel cell is higher than a predetermined operation temperature of the solid-oxide fuel cell and a temperature of the reactor is lower than a predetermined operation temperature of the reactor, and
decrease the flow rate of the fuel supplied to the heat engine if the temperature of the solid oxide fuel cell is higher than the predetermined operation temperature of the solid-oxide fuel cell and the temperature of the reactor is higher than the predetermined operation temperature of the reactor.

2. The power conversion system according to claim 1, wherein the solid-oxide fuel cell and the reactor are connected via a pipe,
wherein off-gas of the solid-oxide fuel cell is supplied to the reactor via the pipe,
and wherein the pipe is provided with a first flow rate adjusting device for adjusting a flow rate of the off-gas.

3. The power conversion system according to claim 1, further comprising:
at least one pipe connecting the heat engine, the solid-oxide fuel cell, and the reactor, the at least one pipe including a valve, wherein the exhaust heat of the heat engine is supplied to both the solid-oxide fuel cell and the reactor via the valve,
wherein the at least one pipe extends such as to branch toward the solid-oxide fuel cell and the reactor.

4. The power conversion system according to claim 3, comprising:
a first temperature detecting device for detecting the temperature of the solid-oxide fuel cell; and
a second temperature detecting device for detecting the temperature of the reactor.

5. The power conversion system according to claim 2, comprising:
a third temperature detecting device for detecting a temperature of the off-gas of the solid-oxide fuel cell, the third temperature detecting device being arranged at the pipe connecting the solid-oxide fuel cell and the reactor;
wherein the controller controls the first flow rate adjusting device such as to adjust the flow rate of the off-gas supplied to the reactor, based on the temperature of the off-gas detected by the third temperature detecting device.

6. The power conversion system according to claim 4, comprising:
a second flow rate adjusting device for adjusting a flow rate of fuel supplied to the heat engine as an internal combustion engine;
a third flow rate adjusting device for adjusting a flow rate of an organic hydride supplied to the reactor; and
a fourth flow rate adjusting device for adjusting a flow rate of hydrogen produced by the reactor and supplied to the solid-oxide fuel cell as fuel,
wherein the controller adjusts at least one of the flow rate of the fuel supplied to the heat engine, the flow rate of the organic hydride supplied to the reactor, and the flow rate of the hydrogen supplied to the solid-oxide fuel cell, by controlling at least one of the second flow rate adjusting device, the third flow rate adjusting device, and the fourth flow rate adjusting device, based on the temperature of the solid-oxide fuel cell detected by the first temperature device and the temperature of the reactor detected by the second temperature detecting device.

* * * * *